(12) United States Patent
Wang et al.

(10) Patent No.: US 11,767,925 B2
(45) Date of Patent: Sep. 26, 2023

(54) POWER-ASSISTED PIPELINE VALVE

(71) Applicant: HAINAN NUCLEAR POWER CO., LTD., Hainan Province (CN)

(72) Inventors: Tongchen Wang, Hainan Province (CN); Jun Zhang, Hainan Province (CN); Mingxing Wu, Hainan Province (CN); Xiaolong Liu, Hainan Province (CN); Jianbin Zhu, Hainan Province (CN); Ruokun Li, Hainan Province (CN); Yu Bao, Hainan Province (CN); Lizhuan Tang, Hainan Province (CN); Jingzhi Yu, Hainan Province (CN); Hengjing Li, Hainan Province (CN)

(73) Assignee: HAINAN NUCLEAR POWER CO., LTD., Hainan Province (CN)

( * ) Notice: Subject to any disclaimer, the term of this patent is extended or adjusted under 35 U.S.C. 154(b) by 0 days.

(21) Appl. No.: 17/989,787

(22) Filed: Nov. 18, 2022

(65) Prior Publication Data

US 2023/0220925 A1 Jul. 13, 2023

(30) Foreign Application Priority Data

Nov. 18, 2021 (CN) .......................... 202111372572.9

(51) Int. Cl.
*F16K 5/06* (2006.01)
*F16K 31/05* (2006.01)
(Continued)

(52) U.S. Cl.
CPC .......... *F16K 31/055* (2013.01); *F16K 5/0605* (2013.01); *F16K 5/0647* (2013.01);
(Continued)

(58) Field of Classification Search
CPC ...... F16K 31/055; F16K 31/535; F16K 31/54; F16K 5/0605; F16K 5/0647; F16K 47/045; F16K 47/02; F16K 47/023
See application file for complete search history.

(56) References Cited

U.S. PATENT DOCUMENTS 4,951,915 A * 8/1990 Piao .................. F16K 31/52408
74/89.17

FOREIGN PATENT DOCUMENTS

CN 112066025 A * 12/2020
CN 212389838 U * 1/2021
(Continued)

*Primary Examiner* — Marina A Tietjen
(74) *Attorney, Agent, or Firm* — Oliff PLC

(57) ABSTRACT

A power-assisted pipeline valve, including a valve body and a pressure relief assembly. A top of the valve body is provided with a first chute. A sliding sleeve is disposed in the valve body and has two sides respectively connected to an inner wall of the valve body through a first spring. A ball valve assembly is disposed in the sliding sleeve and connected to a valve stem. The valve stem passes through the sliding sleeve and is sleeved with a sliding shell, and the sliding shell is disposed in the first chute and provided with a rack and an electric power-assisted mechanism which is connected to the valve stem. The top of the valve body is penetrated by a first rotating shaft which is orderly sleeved with a fifth gear, a rotary table and a third spring from top to bottom. The fifth gear is meshed with the rack. The rotary table is connected to the fifth gear through a centrifugal locking mechanism. The third spring is connected to the rotary table and the valve body respectively. The pressure relief assembly is disposed on the valve body and connected to the rotary table. The present disclosure effectively solves the problems in the prior art that it is laborious for a person with a small strength to operate a manual valve, and a water (Continued)

hammer prevention effect is poor, which seriously affects the service life of the manual valve.

7 Claims, 7 Drawing Sheets

(51) Int. Cl.
    *F16K 31/53*     (2006.01)
    *F16K 31/54*     (2006.01)
    *F16K 47/02*     (2006.01)
    *F16K 47/04*     (2006.01)

(52) U.S. Cl.
    CPC ............ *F16K 31/535* (2013.01); *F16K 31/54* (2013.01); *F16K 47/02* (2013.01); *F16K 47/045* (2013.01)

(56) References Cited

FOREIGN PATENT DOCUMENTS

| CN | 112728150 A | * | 4/2021 |
|---|---|---|---|
| CN | 112728150 A | | 4/2021 |
| CN | 113280145 A | * | 8/2021 |
| CN | 113700889 A | * | 11/2021 |
| CN | 113983195 A | | 1/2022 |
| CN | 114183557 A | * | 3/2022 |
| CN | 114215930 A | | 3/2022 |
| CN | 216200601 U | * | 4/2022 |

* cited by examiner

POWER-ASSISTED PIPELINE VALVE

CROSS-REFERENCE TO RELATED APPLICATIONS

This application claims priority to Chinese Patent Application No. 202111372572.9, filed on Nov. 18, 2021, which is hereby incorporated by reference in its entirety.

TECHNICAL FIELD

The present disclosure relates to the technical field of valves, and particularly to a power-assisted pipeline valve.

BACKGROUND

A large number of infusion pipelines need to be mounted in a nuclear power plant for production and operation, and the water delivery pipeline is the most representative, on which a number of valves should be mounted to control the on-off of transmission of water flow. However, the nuclear power plant usually adopts manual valves, which are controlled to be opened or closed by manual operations, and following problems are existed in the current use process: Firstly, in order to ensure the tightness of a valve, relevant connecting parts of the valve are closely fitted, so during opening or closing of the valve, a person with a small strength is often very laborious, and even needs to seek an auxiliary tool or a helper to open or close the valve, especially for a relatively large valve; Secondly, a water hammer effect may be easily caused when the valve is suddenly closed, and the water hammer cannot be effectively alleviated, which seriously affects the service life of the valve, and may even directly lead to the damage of the valve and the pipeline.

SUMMARY

An objective of the present disclosure is to provide a power-assisted pipeline valve for the deficiencies of the prior art, so as to effectively solve the above technical problems in the background section.

The present disclosure adopts the following technical solutions.

The present disclosure provides a power-assisted pipeline valve, including a valve body and a pressure relief assembly, wherein two sides of the valve body are provided with a water inlet and a water outlet respectively. A top of the valve body is provided with a first chute. A sliding sleeve is slidably disposed in the valve body and has two sides respectively connected to an inner wall of the valve body through a first spring. A ball valve assembly is disposed in the sliding sleeve and connected to a valve stem. The valve stem passes through the sliding sleeve and is rotatably sleeved with a sliding shell, and a top of the valve stem is provided with a handwheel. The sliding shell is slidably disposed in the first chute and provided with a rack and an electric power-assisted mechanism which is connected to the valve stem. The top of the valve body is rotatably penetrated by a first rotating shaft which is orderly sleeved with a fifth gear, a rotary table and a third spring from top to bottom. The fifth gear is connected to the first rotating shaft through a one-way bearing and meshed with the rack. The rotary table is rotationally connected to the first rotating shaft and is connected to the fifth gear through a centrifugal locking mechanism. The third spring is connected to the rotary table and the valve body respectively, and the pressure relief assembly is disposed on the valve body and connected to the rotary table.

Further, the electric power-assisted mechanism includes a torsion bar, a motor, a second gear, a controller and a storage battery. The torsion bar is connected between the valve stem and the handwheel, and a strain gauge is disposed on the torsion bar. The motor is disposed on a side wall of the sliding shell, and an output shaft of the motor protrudes into the sliding shell and is provided with a first gear. The second gear is disposed on the valve stem and meshed with the first gear, and the controller is coupled to the motor, the storage battery and the strain gauge respectively.

Further, a top of the rotary table is provided with a ring body, and a magnet block is provided on each of two opposite sides of an interior of the ring body. The ring body is connected to the fifth gear through the centrifugal locking mechanism. The power-assisted pipeline valve further includes a bracket, a fourth gear and an armature winding. The bracket is disposed in the water inlet and rotatably penetrated by a second rotating shaft, which has two ends provided with blades and a third gear respectively. The fourth gear is disposed on the first rotating shaft and meshed with the third gear. The armature winding is disposed on the first rotating shaft and located between the two magnet blocks, and is coupled to the storage battery.

Further, the centrifugal locking mechanism includes an inner ratchet, a centrifugal claw, a stopper and a second spring. The inner ratchet is disposed on a top of the ring body and located on a periphery of the fifth gear. The centrifugal claw and the stopper are both disposed on a bottom of the fifth gear, and the centrifugal claw is hinged with a lower surface of the fifth gear. Two ends of the second spring abut against one end of the stopper and one end of the centrifugal claw, respectively.

Further, the pressure relief assembly includes an extensible groove, a drain hole and a second chute. The extensible groove is disposed on a lower surface of the rotary table, the drain hole and the second chute are both disposed on the valve body, the second chute is intersected with the drain hole and provided with an avoidance groove, a baffle is slidably disposed in the second chute and provided with a pin and a communication hole, and the pin passes through an avoidance opening and is movably disposed in the extensible groove.

Further, the extensible groove includes a concentric chute and an eccentric chute, and an end of the eccentric chute is extended away from the first rotating shaft and connected to the concentric chute.

Further, the ball valve assembly includes a valve ball disposed in the sliding sleeve and connected to the valve stem, and a valve seat is provided on each of two opposite sides of the valve ball and embedded in the sliding sleeve.

As compared with the prior art, the present disclosure has the following advantageous effects.

1. Through the design of the cooperation between the sliding shell and the first chute, when the handwheel is turned, the electric power-assisted mechanism drives the valve stem to rotate, so that the opening or closing of the valve is labor-saving and the operation labor can be reduced.

2. When the valve is closed in case of a low speed of the water flow in the pipeline, the water flow impacts on the valve ball assembly, so that the ball valve assembly drives the sliding sleeve to slide at a low speed in the valve body, and the sliding sleeve acts on the first spring to deform it for buffering, thus effectively alleviating the water hammer generated by the low-speed water flow. When the valve is closed in case of a high speed of the water flow in the pipeline, the sliding sleeve drives the sliding shell to move quickly to the right side of the valve body, and the sliding shell drives the fifth gear to rotate quickly through the rack, so that the centrifugal locking mechanism locks the fifth gear with the rotary table, and the rotary table drives the pressure relief assembly to perform a quick pressure relief in the pipeline, so as to timely and quickly release the water pressure in the pipeline, and effectively avoid the problem that excessive impacts are caused on the valve and the pipeline since the first spring cannot eliminate the water hammer effect in time due to the too fast speed of the water flow, thus effectively relieving the large water hammer impact and achieving a good water hammer prevention effect.

3. The water flow is utilized to drive the blades to rotate, and through the first rotating shaft, the blades drive the armature winding to rotate relative to the magnet block to generate power and store the power in the storage battery, so that the valve does not need an external power supply, thus avoiding the line power loss of electric energy caused by external lines, and effectively utilizing the water flow for power generation to achieve the effects of energy saving and environment protection.

4. When the low-speed water flow acts on the valve, the sliding sleeve slides to the right side of the valve body, the rack drives the fifth gear to rotate, the fifth gear drives the first rotating shaft through the one-way bearing, and the first rotating shaft drives the armature winding to rotate relative to the electromagnet, so that the armature winding cuts magnetic induction lines and generates an induced potential to charge the storage battery, which can effectively collect the water hammer energy for power generation while alleviating the impact of the water hammer, and improve the energy utilization rate.

BRIEF DESCRIPTION OF DRAWINGS

For a clearer illustration of technical features in the embodiments of the present disclosure, a brief description of the drawings for the embodiments will be given below. Obviously, the drawings described below involve only some embodiments of this disclosure. For those of ordinary skill in the art, other drawings can be derived from these drawings without any inventive efforts. In the drawings.

Figure 1:
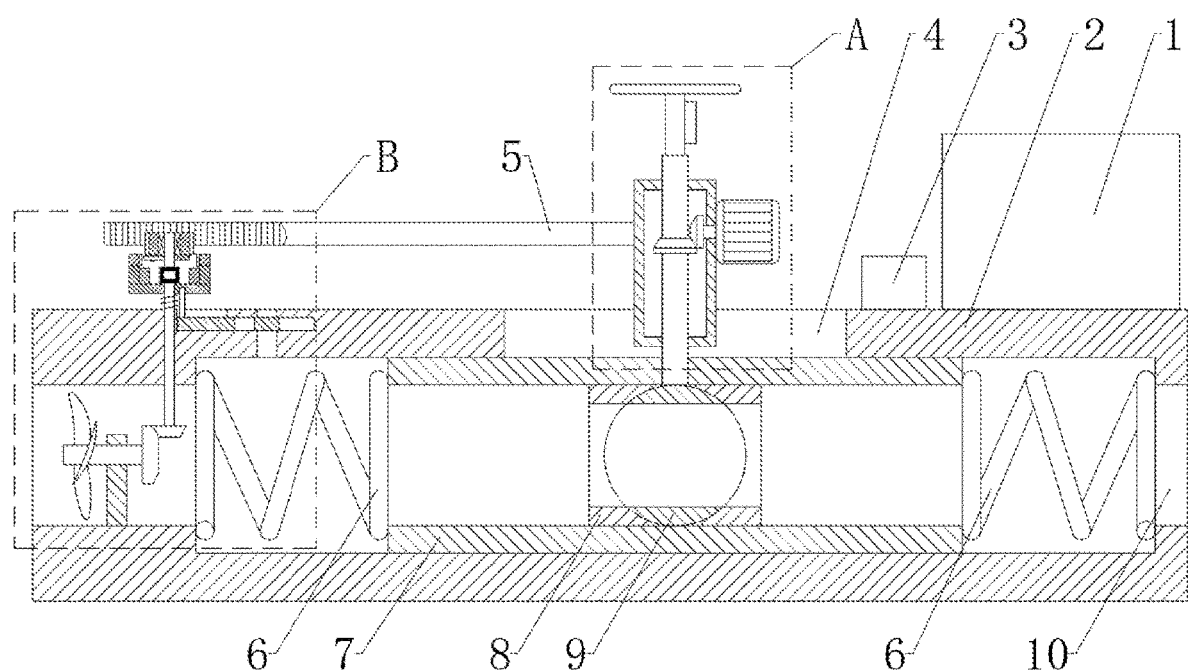
FIG. 1 is a schematic diagram of an overall structure of the present disclosure.

REFERENCE NUMERALS 1. storage battery; 2. valve body; 3. controller; 4. first chute; 5. rack; 6. first spring; 7. sliding sleeve; 8. valve seat; 9. valve ball; 10. water outlet; 11. sliding shell; 12. motor; 13. strain gauge; 14. handwheel; 15. torsion bar; 16. first gear; 17. second gear; 18. valve stem; 19. one-way bearing; 20. first rotating shaft; 21. fourth gear; 22. water inlet; 23. second rotating shaft; 24. blade; 25. bracket; 26. third gear; 28. drain hole; 29. magnet block; 30. coil; 31. fifth gear; 32. third spring; 33. second chute; 34. baffle; 35. pin; 36. avoidance opening; 37. rotary table; 38. inner ratchet; 39. centrifugal claw; 40. ring body; 41. stopper; 42. second spring; 43. extensible groove; 44. communication hole.

DESCRIPTION OF EMBODIMENTS

For a clearer understanding of the objectives, technical features and effects of the embodiments of the present disclosure, specific embodiments will now be described with reference to the drawings. The described embodiments are intended only to schematically illustrate and explain this invention and do not limit the scope of the present disclosure.

Figure 2:
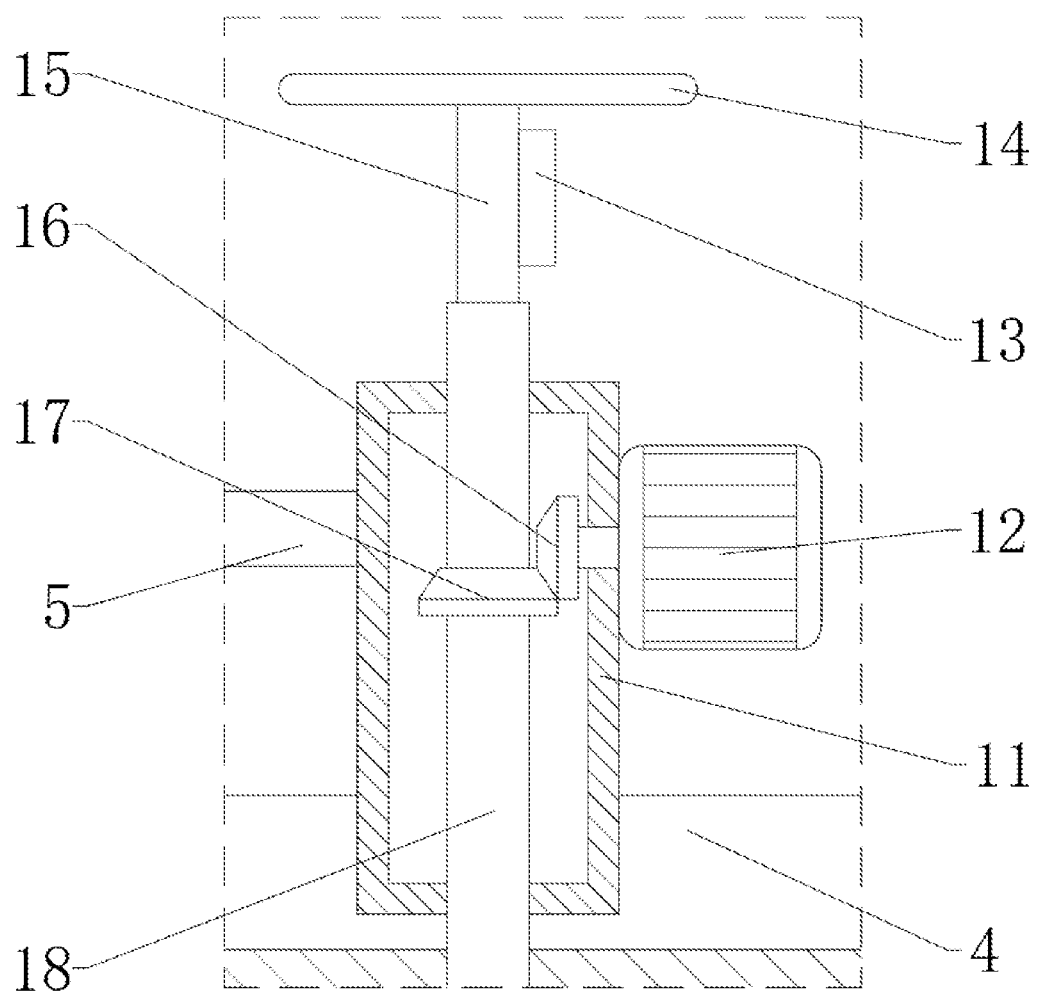
FIG. 2 is an enlarged view at A in FIG. 1.
Figure 3:
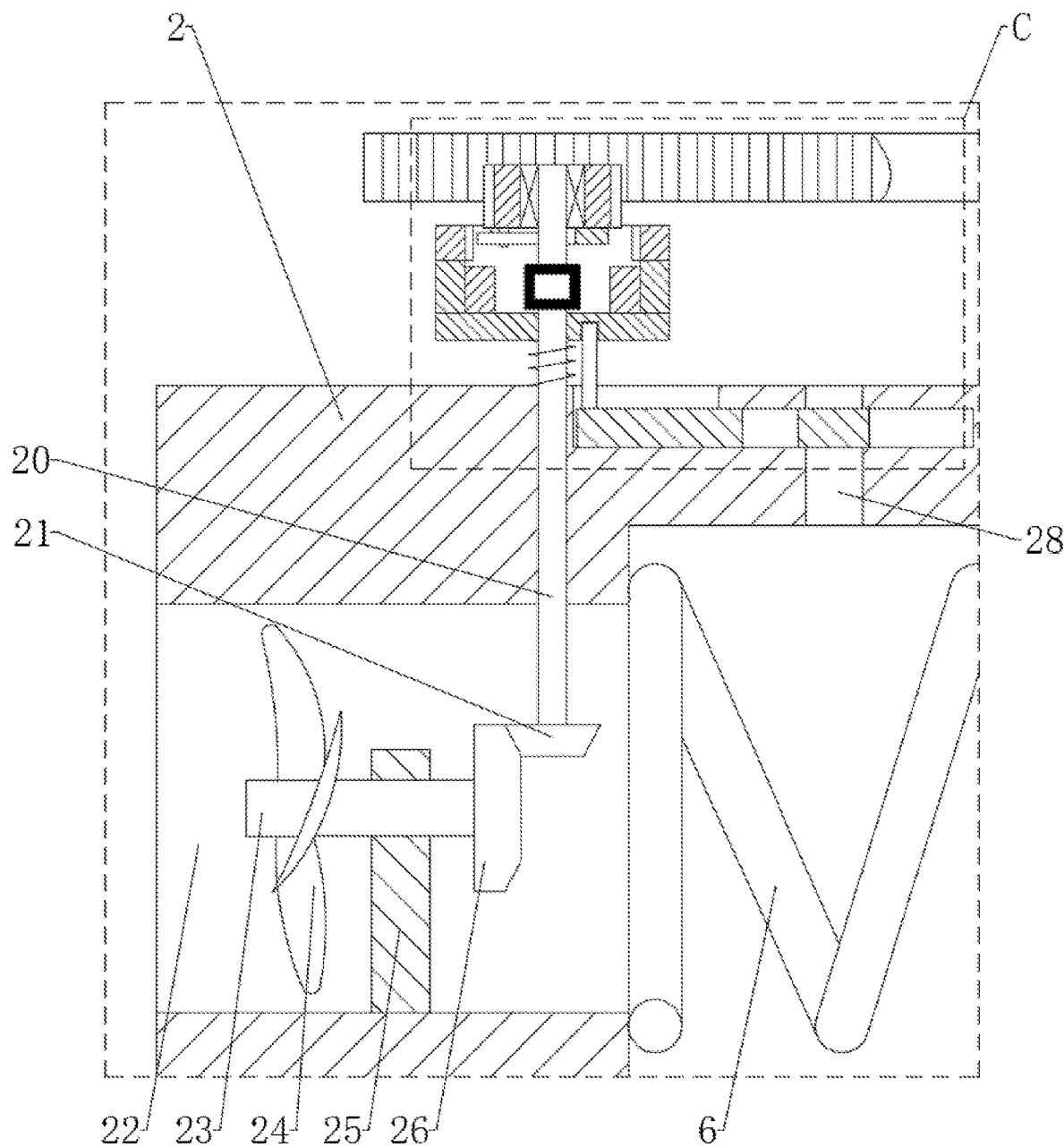
FIG. 3 is an enlarged view at B in FIG. 1.
Figure 4:
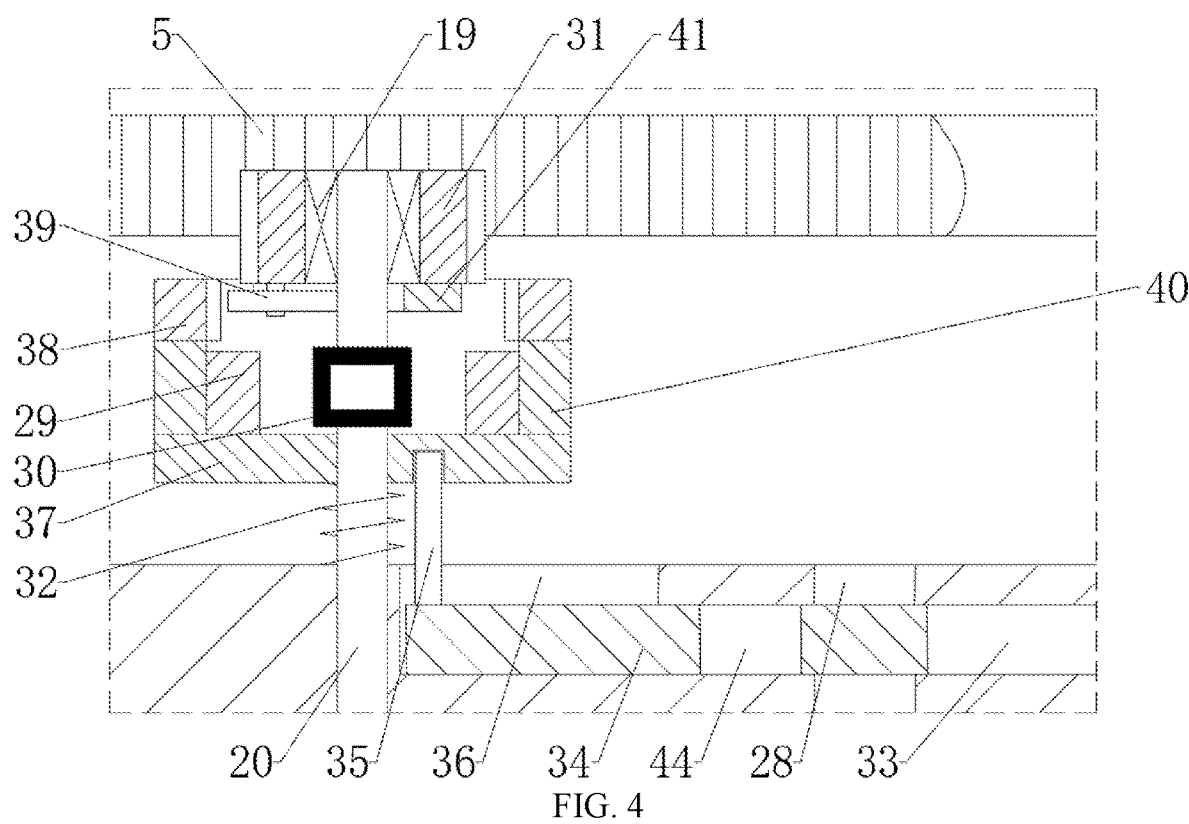
FIG. 4 is an enlarged view at C in FIG. 3.
Figure 5:
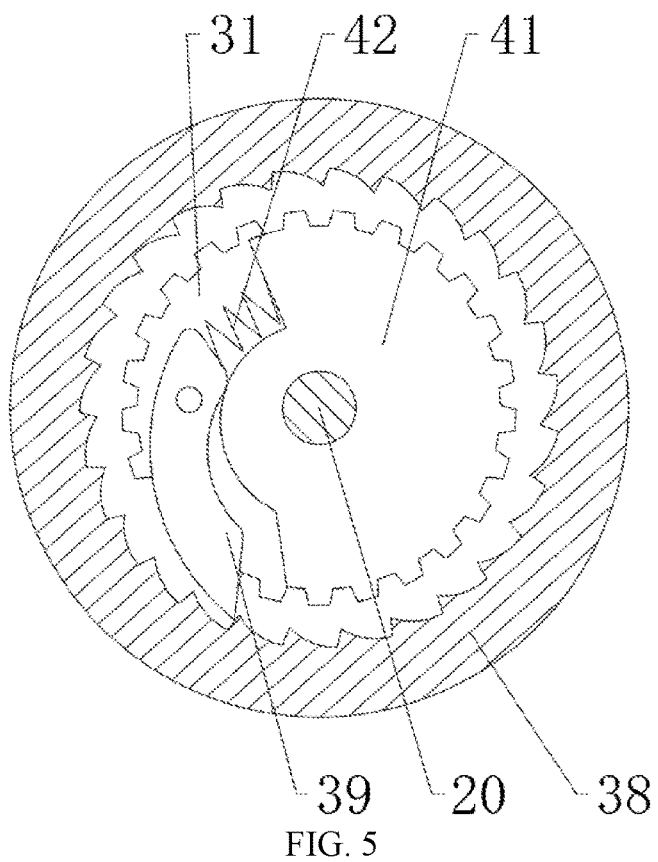
FIG. 5 is a schematic diagram (bottom view) of a cooperation structure of a centrifugal locking mechanism in a locked state in the present disclosure.
Figure 6:
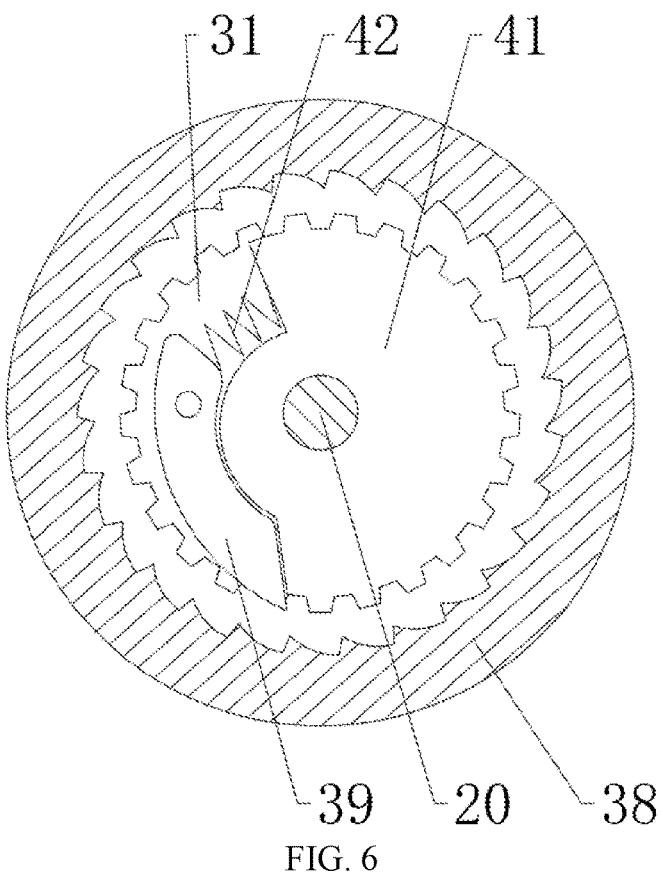
FIG. 6 is a schematic diagram (top view) of a cooperation structure of a centrifugal locking mechanism in an unlocked state in the present disclosure.
Figure 7:
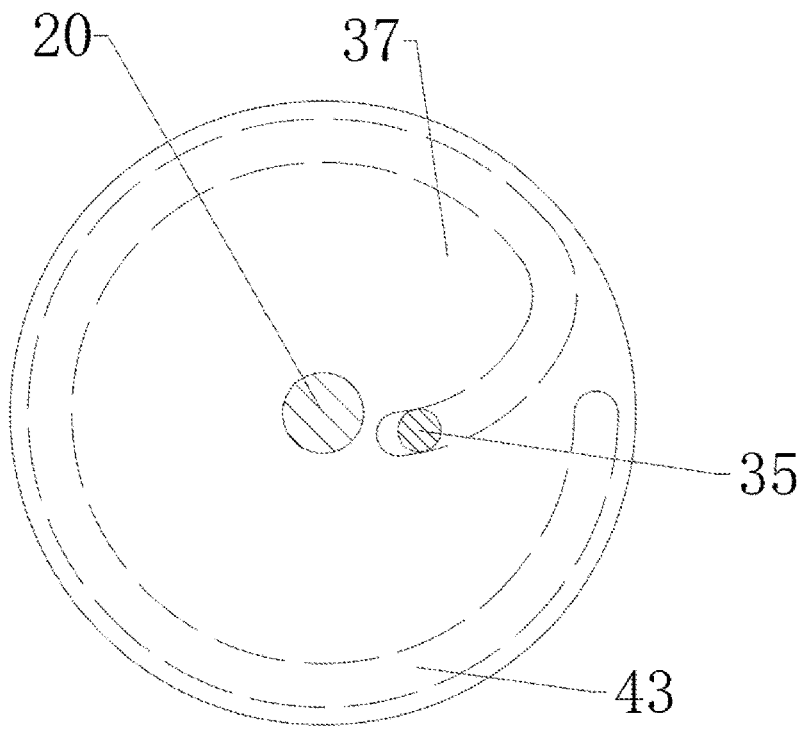
FIG. 7 is a schematic diagram (top view) of a cooperation structure of a rotary table and a pin in the present disclosure.
Figure 8:
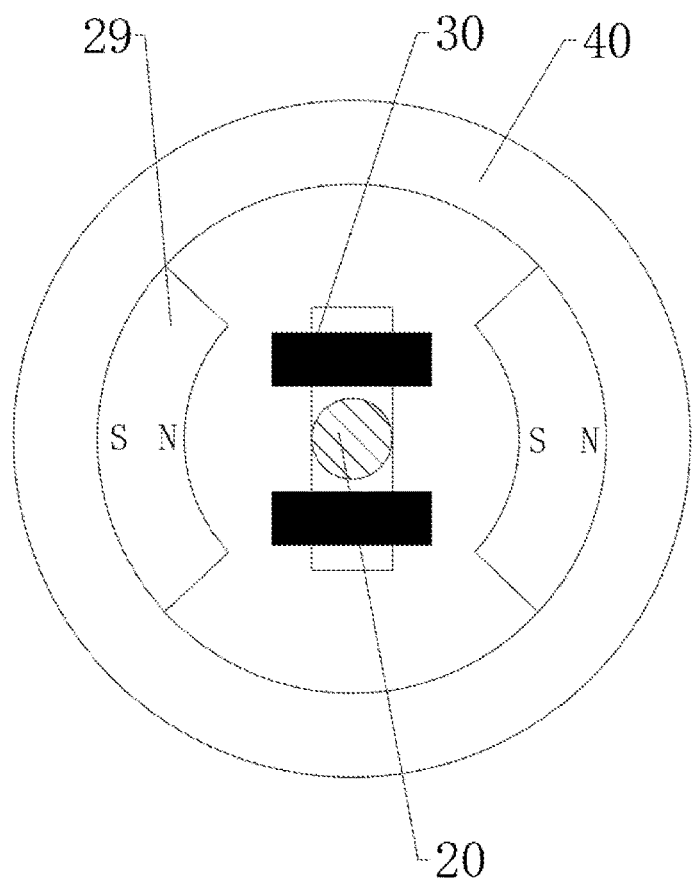
FIG. 8 is a schematic diagram (top view) of a cooperation structure of a ring body and a first rotating shaft in the present disclosure.
Figure 9:
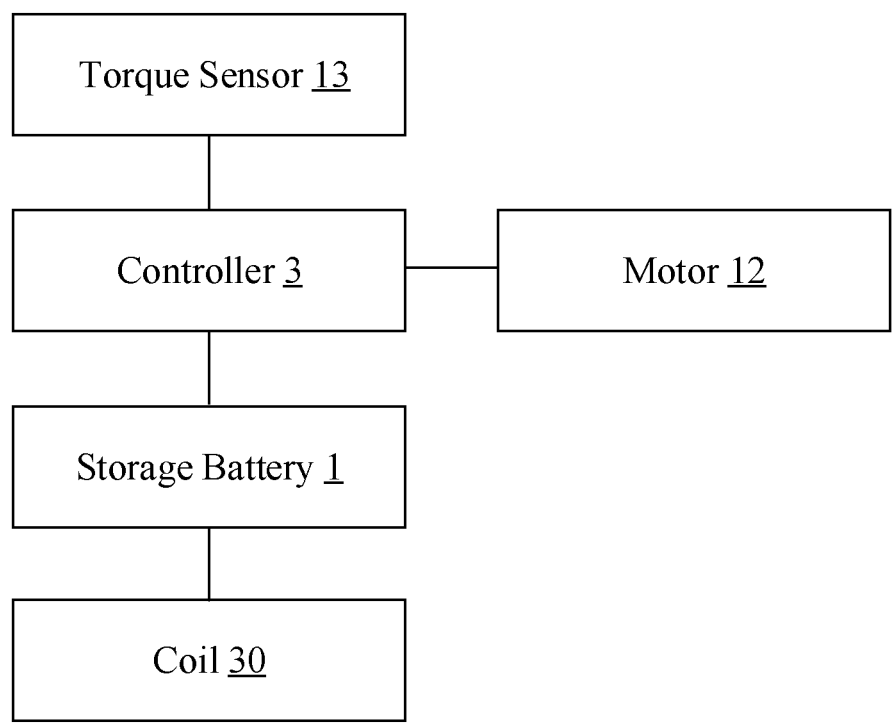
FIG. 9 is a control principle diagram of the present disclosure.

Referring to FIGS. 1 to 9, the present disclosure provides a power-assisted pipeline valve, including a valve body 2 and a pressure relief assembly. Left and right sides of the valve body 2 are provided with a water inlet 22 and a water outlet 10, respectively. The valve is connected between pipelines through the water inlet 22 and the water outlet 10. A top of the valve body 2 is provided with a first chute 4. A sliding sleeve 7 is slidably disposed in the valve body 2 and has two sides respectively connected to an inner wall of the valve body 2 through a first spring 6. A ball valve assembly is disposed in the sliding sleeve 7 and configured to conduct and block a water flow. The ball valve assembly is connected to a valve stem 18, which passes through the sliding sleeve 7 and is rotatably sleeved with a sliding shell 11. A top of the valve stem 18 is provided with a handwheel 14. The sliding shell 11 is slidably disposed in the first chute 4 and provided with a rack 5 and an electric power-assisted mechanism which is connected to the valve stem 18. The top of the valve body 2 is rotatably penetrated by a first rotating shaft 20 which is orderly sleeved with a fifth gear 31, a rotary table 37 and a second spring 42 from top to bottom. The fifth gear 31 is connected to the first rotating shaft 20 through a one-way bearing 19 which allows the fifth gear 31 to only rotate counterclockwise (in the top view direction in FIG. 1) on the first rotating shaft 20, so that the fifth gear 31 can drive the first rotating shaft to rotate clockwise (in the top view direction in FIG. 1) through the one-way bearing 19. The fifth gear 31 is meshed with the rack 5. The rotary table 37 is rotatably connected to the first rotating shaft 20. The rotary table 37 is connected to the fifth gear 31 through a centrifugal locking mechanism. Two ends of the second spring 42 are connected to a bottom of the rotary table 37 and the top of the valve body 2 respectively. The pressure relief assembly is disposed on the valve body 2 and connected to the rotary table 37. By turning the handwheel 14, the valve stem 18 is caused to rotate and drive the ball valve assembly to open or close the valve. In this process, when detecting that a rotational torque is too large, the electric power-assisted mechanism drives the valve stem 18 to rotate to provide torsional power, thus achieving the effects of labor saving and convenient operation. When the valve is closed in case of a low speed of the water flow in the pipeline, the water flow impacts on the valve, so that the ball valve assembly drives the sliding sleeve 7 to slide to the right side of the valve body 2 at a low speed, and the sliding sleeve 7 compresses the first spring 6 on the right side while stretching the first spring 6 on the left side, thus effectively alleviating the impact of the low-speed water flow. When the valve is closed in case of a high speed of the water flow in the pipeline, the sliding sleeve 7 drives the sliding shell 11 to quickly slide to the right side of the valve body 2. Since the sliding shell 11 can only slide left and right in the first chute 4 rather than rotating around the valve stem 18 in the first chute 4, the sliding shell 11 drives the fifth gear 31 to rotate rapidly through the rack 5, the fifth gear 31 is quickly locked with the rotary table 37 through the centrifugal locking mechanism and drives the rotary table 37 to rotate, then the rotary table 37 drives the pressure relief assembly to quickly and timely relieve the pressure of the pipeline, so as to avoid the problem that excessive impacts are caused on the valve and the pipeline since the first spring 6 cannot relieve the water hammer impact in time due to the too fast speed of the water flow, thus effectively relieving the large water hammer effect and achieving a good water hammer prevention effect.

Specifically, the electric power-assisted mechanism includes a torsion bar 15, a motor 12, a second gear 17, a controller 3 and a storage battery 1. The torsion bar 15 is connected between the valve stem 18 and the handwheel 14, and a strain gauge 13 is disposed on the torsion bar 15. The motor 12 is disposed on a side wall of the sliding shell 11, and an output shaft of the motor 12 protrudes into the sliding shell 11 and is provided with a first gear 16. The second gear 17 is disposed on the valve stem 18 and meshed with the first gear 16. The controller 3 is coupled to the motor 12, the storage battery 1 and the strain gauge 13 respectively, and the storage battery 1 supplies power to the controller 3 and the motor 12, respectively. When the handwheel 14 is turned to open or close the valve, the torsion bar 15 is deformed, so that the strain gauge 13 is deformed and outputs a voltage signal, thus detecting the rotational torque. The controller 3 receives the voltage signal and compares it with a preset threshold (20 N·m). When the detected rotational torque is greater than the preset threshold, indicating that it is laborious to open or close the valve. Then, the controller 3 controls the motor 12 to drive the first gear 16 to rotate forward or reversely, and the first gear 16 drives the valve stem 18 to rotate through the second gear 17 to provide an assistance, so as to effectively reduce the operation labor for opening or closing the valve. When the strain gauge 13 detects that the rotational torque is less than the preset threshold, indicating that the torque required for opening or closing the valve is small and no assistance is required, so the motor 12 does not work. At this time, the operator only needs to turn the handwheel 14, which drives the valve stem 18 to rotate through the torsion bar 15, so that the valve stem 18 drives the ball valve assembly to open or close the valve, which can provide an output torque according to manual forces of different operators and is suitable for the operators with different manual forces to open or close the valve. Therefore, the applicability is high, and the operation of opening or closing the valve is labor-saving and convenient.

Specifically, a top of the rotary table 37 is provided with a ring body 40. A magnet block 29 is provided on each of two opposite sides of an interior of the ring body 40. The ring body 40 is connected to the fifth gear 31 through the centrifugal locking mechanism. The power-assisted pipeline valve further includes a bracket 25, a fourth gear 21 and an armature winding. The bracket 25 is disposed in the water inlet 22 and rotatably penetrated by a second rotating shaft 23, which has two ends provided with blades 24 and a third gear 26 respectively. The fourth gear 21 is disposed on the first rotating shaft 20 and meshed with the third gear 26. The armature winding is disposed on the first rotating shaft 20 and located between the two magnet blocks 29 which have north and south poles oppositely disposed, and the armature winding is coupled to the storage battery 1. The armature winding includes a plurality of winding cores disposed on the first rotating shaft 20 at intervals and coils 30 wound on the winding cores. The coils 30 are coupled to the storage battery 1. When the valve is opened, the blades 24 are driven by the water flow to rotate clockwise (in the left view direction in FIG. 1), and the blades 24 drive the second rotating shaft 23 to rotate clockwise (in the left view direction in FIG. 1) on the bracket 25. The second rotating shaft 23 drives the first rotating shaft 20 to rotate counter-clockwise (in the top view direction in FIG. 1) on the top of the valve body 2 through the third gear 26 and the fourth gear 21, and the first rotating shaft 20 drives the armature winding to rotate between the two magnet blocks 29, so that the armature winding cuts magnetic induction lines to generate an induced potential and charge the storage battery 1, which achieves a high charging efficiency, ensures sufficient electricity of the storage battery 1, does not require an external power supply for the valve, and avoids a line power loss of electric energy caused by external lines. When the speed of the water flow is low and the valve is closed, the ball valve assembly drives the sliding shell 11 to slide to the right side of the first chute 4 through the valve stem 18, and the sliding shell 11 drives the fifth gear 31 to rotate clockwise (in the top view direction in FIG. 1) through the rack 5. At this time, the rotation speed of the fifth gear 31 cannot make the centrifugal locking mechanism lock the fifth gear 31 and the rotary table 37, and under a torsional elastic force of the third spring 32, the rotary table 37 is kept at a position where the drain hole 28 is blocked. Thus, the fifth gear 31 drives the first rotating shaft 20 to rotate clockwise (in the top view direction in FIG. 1) through the one-way bearing 19, and the first rotating shaft 20 drives the armature winding to rotate relative to the magnet block 29, so that the armature winding cuts magnetic induction lines to generate an induced potential and charge the storage battery 1, which can effectively collect water hammer energy for power generation, further improve the energy utilization rate, and achieve the effects of energy conservation and environmental protection.

Specifically, the centrifugal locking mechanism includes an inner ratchet 38, a centrifugal claw 39, a stopper 41 and a second spring 42. The inner ratchet 38 is disposed on a top of the ring body 40 and located on a periphery of the fifth gear 31. The centrifugal claw 39 and the stopper 41 are both disposed on a bottom of the fifth gear 31. A side of the centrifugal claw 39 away from a clamping end is hinged with a lower surface of the fifth gear 31. Two ends of the second spring 42 abut against one end of the stopper 41 and one end of the centrifugal claw 39 respectively. When the speed of the water flow is high and the valve is closed, the fifth gear 31 drives the centrifugal claw 39 to quickly rotate clockwise (in the top view direction of FIG. 1). Under the centrifugal force, the centrifugal claw 39 overcomes the elastic force of the second spring 42, so that the clamping end of the centrifugal claw 39 is opened outwards and clamped onto the inner ratchet 38, and the fifth gear 31 drives the rotary table 37 to rotate clockwise (in the top view of FIG. 1). Thus, the reaction is quick, the problem of the easy damage in the wet environment due to the control by the electrical device can be avoided, the use reliability is high and the service life is long. The pressure in the pipeline is reduced along with the pressure release in the pipeline, and the sliding sleeve 7 is enabled to slide to the left side of the valve body 2 under the action of the first spring 6, so the sliding sleeve 7 drives the centrifugal claw 39 to slowly rotate counterclockwise through the sliding shell 11, the rack 5 and the fifth gear 31. At this time, as the centrifugal force acting on the centrifugal claw 39 disappears, the centrifugal claw 39 is separated from the inner ratchet 38 and reset by the resilience force of the second spring 42. Finally, the rotational torsion of the third spring 32 causes the rotary table 37 to rotate clockwise (in the top view direction of FIG. 1) to be reset, and then the rotary table 37 rotates and drives the pressure relief assembly to stop the pressure relief of the pipeline.

Specifically, the pressure relief assembly includes an extensible groove 43, a drain hole 28 and a second chute 33. The extensible groove 43 is disposed on a lower surface of the rotary table 37. The drain hole 28 and the second chute 33 are both disposed on the valve body 2, and the second chute 33 is intersected with the drain hole 28 and provided with an avoidance groove. A baffle 34 is slidably disposed in the second chute 33 and provided with a pin 35 and a communication hole 44, and the pin 35 passes through an avoidance opening 36 and is movably disposed in the extensible groove 43. The rotary table 37 rotates and drives the extensible groove 43 to rotate, so that the pin 35 slides in the extensible groove 43. The pin 35 slides away from the first rotating shaft 20, and pushes the baffle 34 to slide to the right side of the second chute 33, so that the communication hole 44 is aligned with the drain hole 28 for pressure relief. When the pressure in the pipeline is reduced, the rotary torsion of the third spring 32 causes the rotary table 37 to rotate, and then the rotary table 37 drives the baffle 34 to slide to the left side through a cooperation between the extensible groove 43 and the pin 35, so that the communication hole 44 is staggered with the drain hole 28 to stop the pressure relief. The structure is simple, the pressure relief response is quick, and the water hammer relief effect is good.

Specifically, the extensible groove 43 includes a concentric chute and an eccentric chute, and an end of the eccentric chute is extended away from the first rotating shaft 20 and connected to the concentric chute. When the valve is opened, the pin 35 is located at an end of the eccentric chute close to the first rotating shaft 20, the rotary table 37 drives the extensible groove 43 to rotate counterclockwise (in the top view direction in FIG. 1), so that the pin 35 slides quickly along the eccentric chute in a direction away from the first rotating shaft 20 for pressure relief. In the process that the sliding sleeve 7 continues to slide quickly to the right side of the valve body 2, the pin 35 enters the concentric chute and slides therein, so that the drain hole 28 is kept in an open state, and under the cooperative buffering effect of the first spring 6, the large water hammer impact can be effectively relieved, and the water hammer prevention effect is good.

Specifically, the ball valve assembly includes a valve ball 9 disposed in the sliding sleeve 7 and connected to the valve stem 18. A valve seat 8 is provided on each of two opposite sides of the valve ball 9 and embedded in the sliding sleeve 7. Both the valve seat 8 and the valve ball 9 are provided with through holes, and the valve is opened when the valve ball 9 is rotated to a position where the through hole of the valve ball 9 is aligned with the through hole of the valve seat 8. The ball valve assembly is prior art and will not be described here.

Described above is merely exemplary embodiments of the present disclosure, and is not meant to limit the present disclosure. Various modifications and variations may be made to the present disclosure by those skilled in the art. Any modifications, alternations, improvements, etc., made by those skilled in the art without departing from the concepts and principles of this disclosure shall fall within the scope of the claims.

The invention claimed is:

1. A power-assisted pipeline valve, comprising a valve body and a pressure relief assembly, wherein two sides of the valve body are provided with a water inlet and a water outlet respectively, and a top of the valve body is provided with a first chute; a sliding sleeve is slidably disposed in the valve body and has two sides respectively connected to an inner wall of the valve body through a first spring; a ball valve assembly is disposed in the sliding sleeve and connected to a valve stem; the valve stem passes through the sliding sleeve and is rotatably sleeved with a sliding shell, and a top of the valve stem is provided with a handwheel; the sliding shell is slidably disposed in the first chute and provided with a rack and an electric power-assisted mechanism which is connected to the valve stem; the top of the valve body is rotatably penetrated by a first rotating shaft which is orderly sleeved with a fifth gear, a rotary table and a third spring from top to bottom; the fifth gear is connected to the first rotating shaft through a one-way bearing and meshed with the rack; the rotary table is rotationally connected to the first rotating shaft and is connected to the fifth gear through a centrifugal locking mechanism; and the third spring is connected to the rotary table and the valve body respectively, and the pressure relief assembly is disposed on the valve body and connected to the rotary table.

2. The power-assisted pipeline valve according to claim 1, wherein the electric power-assisted mechanism comprises a torsion bar, a motor, a second gear, a controller and a storage battery; the torsion bar is connected between the valve stem and the handwheel, and a strain gauge is disposed on the torsion bar; the motor is disposed on a side wall of the sliding shell, and an output shaft of the motor protrudes into the sliding shell and is provided with a first gear; and the second gear is disposed on the valve stem and meshed with the first gear, and the controller is coupled to the motor, the storage battery and the strain gauge respectively.

3. The power-assisted pipeline valve according to claim 2, wherein a top of the rotary table is provided with a ring body, and a magnet block is provided on each of two opposite sides of an interior of the ring body; the ring body is connected to the fifth gear through the centrifugal locking mechanism; the power-assisted pipeline valve further comprises a bracket, a fourth gear and an armature winding; the bracket is disposed in the water inlet and rotatably penetrated by a second rotating shaft, which has two ends provided with blades and a third gear respectively; the fourth gear is disposed on the first rotating shaft and meshed with the third gear; and the armature winding is disposed on the first rotating shaft and located between the two magnet blocks, and is coupled to the storage battery.

4. The power-assisted pipeline valve according to claim 3, wherein the centrifugal locking mechanism comprises an inner ratchet, a centrifugal claw, a stopper and a second spring; the inner ratchet is disposed on a top of the ring body and located on a periphery of the fifth gear; the centrifugal claw and the stopper are both disposed on a bottom of the fifth gear, and the centrifugal claw is hinged with a lower surface of the fifth gear; and two ends of the second spring abut against one end of the stopper and one end of the centrifugal claw, respectively.

5. The power-assisted pipeline valve according to claim 1, wherein the pressure relief assembly comprises an extensible groove, a drain hole and a second chute; the extensible groove is disposed on a lower surface of the rotary table, the drain hole and the second chute are both disposed on the valve body, the second chute is intersected with the drain hole and provided with an avoidance groove, a baffle is slidably disposed in the second chute and provided with a pin and a communication hole, and the pin passes through an avoidance opening and is movably disposed in the extensible groove.

6. The power-assisted pipeline valve according to claim 5, wherein the extensible groove comprises a concentric chute and an eccentric chute, and an end of the eccentric chute is extended away from the first rotating shaft and connected to the concentric chute.

7. The power-assisted pipeline valve according to claim 1, wherein the ball valve assembly comprises a valve ball disposed in the sliding sleeve and connected to the valve stem, and a valve seat is provided on each of two opposite sides of the valve ball and embedded in the sliding sleeve.

* * * * *